United States Patent [19]
Brungardt et al.

[11] Patent Number: 6,048,392
[45] Date of Patent: *Apr. 11, 2000

[54] ALKALINE PAPER SURFACE SIZING AGENTS

[75] Inventors: Clement L. Brungardt, Oxford, Pa.; Richard J. Riehle; Jian Jian Zhang, both of Wilmington, Del.

[73] Assignee: Hercules Incorporated, Wilmington, Del.

[*] Notice: This patent is subject to a terminal disclaimer.

[21] Appl. No.: 08/996,855

[22] Filed: Dec. 23, 1997

Related U.S. Application Data

[62] Division of application No. 08/601,113, Feb. 16, 1996, Pat. No. 5,846,663, which is a continuation of application No. 08/192,570, Feb. 7, 1994, Pat. No. 5,685,815.

[51] Int. Cl.[7] ...................................................... C09D 7/12
[52] U.S. Cl. ........................................................ 106/287.21
[58] Field of Search ......................................... 106/287.14

[56] References Cited

U.S. PATENT DOCUMENTS

| | | | |
|---|---|---|---|
| 2,383,863 | 8/1945 | Hueter | 260/550 |
| 2,772,969 | 12/1956 | Reynolds, Jr. et al. | 162/179 |
| 2,776,226 | 1/1957 | Hart | 117/64 |
| 2,785,067 | 3/1957 | Osberg, Jr. | 92/21 |
| 2,959,512 | 11/1960 | Roberson | 154/138 |
| 2,992,964 | 7/1961 | Werner et al. | 162/178 |
| 3,251,732 | 5/1966 | Aldrich | 162/179 |
| 3,311,532 | 3/1967 | Kulick et al. | 162/179 |
| 3,392,085 | 7/1968 | Oliver | 162/175 |
| 3,404,064 | 10/1968 | Feazel | 162/179 |
| 3,992,345 | 11/1976 | Dumas | 524/612 |
| 4,240,935 | 12/1980 | Dumas | 524/72 |
| 4,295,931 | 10/1981 | Dumas | 162/158 |
| 4,317,756 | 3/1982 | Dumas | 524/607 |
| 4,382,129 | 5/1983 | Banker | 524/598 |
| 4,522,686 | 6/1985 | Dumas | 162/158 |
| 4,687,519 | 8/1987 | Trzasko et al. | 106/211 |
| 4,698,259 | 10/1987 | Hervey | 428/378 |
| 4,859,244 | 8/1989 | Floyd | 106/243 |
| 4,861,376 | 8/1989 | Edwards et al. | 106/123 |
| 4,919,724 | 4/1990 | Cenisio et al. | 106/199 |
| 4,927,496 | 5/1990 | Walkden | 162/136 |
| 5,026,457 | 6/1991 | Eichinger et al. | 162/158 |
| 5,032,320 | 7/1991 | Guiterrez et al. | 252/565 |
| 5,484,952 | 1/1996 | Nolan et al. | 549/329 |
| 5,846,663 | 8/1998 | Brungardt et al. | 428/537.5 |
| 5,879,814 | 9/1999 | Bottorff | 428/537.5 |

FOREIGN PATENT DOCUMENTS

| | | |
|---|---|---|
| 624579 | 11/1994 | European Pat. Off. . |
| 629 741 | 12/1994 | European Pat. Off. . |
| 666368 | 8/1995 | European Pat. Off. . |
| 742315 | 5/1996 | European Pat. Off. . |
| 168991 | 7/1989 | Japan . |
| 168992 | 7/1989 | Japan . |
| 4-36258 | 2/1992 | Japan . |
| 4-36259 | 2/1992 | Japan . |
| 427940 | 5/1983 | Sweden . |

OTHER PUBLICATIONS

Abstract of Sweden 427,940. No Date Provided.
Abstracts from Chemical Patents Index, Derwent Publications, Week 9304, (Mar. 17, 1993) for JP 4361687 through JP 4361691.
Aquapel® Sizing Agent Trade Literature ( © Hercules Powder Company, 1963), No Month Provided.
J. Borch & R. G. Zvendesn, "Paper Material Considerations for System Printers", IBM Journal, R&D 28, No. 3, pp. 285–291 (1984). No Month Provided.
J. Borch, "Neutral/Alkaline Paper Making", TAPPI Neutral. Alkaline Papermaking Short COurse, Notes: 39 (1990). No Month Provided.
Bottorff, "The AKD Sizing Mechanism: A More Definitive Description", Tappi Journal, vol. 77, No. 4, (Apr. 1994).
Bottorff, "The AKD Sizing Mechanism: A More Definitive Description" (TAPPI Press, 1993), No Month Provided.
Brungardt, C.L. & Gast,J.C., "Improving the Converting and End–Use Performance of Alkaline Fine Paper", TAPPI Paper Makers Conf. Proceedings, (Apr. 1994).
C.L. Brungardt & J.C. Gast, "Alkenyl–Substituted Sizing Agents for Precision Converting Grades of Fine Paper", TAPPI Papermakers' Conference Proceedings (1996). No Month Provided.
R. E. Cates, et al., "Alkyl Ketene Dimer Sizes", *The Sizing of Paper*, Chapter 2, p. 33 (Second Ed., W. F. Reynolds Ed., TAPPI Press (1989). No Month Provided.
Derwent Abstract of JP 2068399, published ( Mar. 7, 1990) ( Arakawa Kagaku Kogyo).
Derwent Abstract of JP 1168992, published (Jul. 4, 1989)(Nippon Oils & Fats KK).
Dumas and Evans, "AKD–Celulose Reactivity in Papermaking Systems", 1986 Papermakers Conference (TAPPI Press, (1986), No Month Provided.
Emerox® 1144 Azelaic Acid (Henkel Corporation) (Mar. 1996).
Emerex® 1110 Azelaic Acid (Henkel Corporation) (Mar. 1996).
Farley, C.E. & Wasser, R.B., "The Sizing of Paper (Sec. Ed.)", "Sizing With Alkenyl Succinic Anhydride", (1989) No Month Provided pp. 51–62.
Gast, J.C., "Improving the Performance of Alkaline Fine Paper On The IBM 3800(R) Laser Printer", TAPPI Paper Makers Conf. Proceedings, (1991) No Month Provided p.1.

(List continued on next page.)

*Primary Examiner*—David Brunsman
*Attorney, Agent, or Firm*—Mark D. Kuller; Martin F. Sloan

[57] ABSTRACT

A sizing agent for paper that is a 2-oxetanone ketene multimer which is not solid at 35° C., particularly a multimer mixture in which at least 25 weight percent of the hydrocarbon substituents contain irregularities such as branched alkyl groups or linear or branched alkenyl groups. Paper surface sized with the 2-oxetanone ketene multimer sizing agent and the method of surface sizing paper are also disclosed.

21 Claims, No Drawings

OTHER PUBLICATIONS

Hercules Powder Company, Paper Makers Chemical Department, "Properties and Uses of Aquapel®" (1960) No Month Provided.

"Hercules Develops Alkaline Paper Size Designed For Precision Converting Grades" (Jan. 17, 1994).

"High Purity, Low–Rosin Tall Oil Fatty Acids" (Description of Pamak 1,2 and 4A) (Jun. 29, 1994).

IBM 3825 Page Printer Paper Reference (G544–3483), (Sep. 1988).

M.A. Meizner, "Alkaline Fine Paper Sizing Technology—Recent Developments" (1995), No Month Provided.

Meixner,M.A. & Ramaswamy,S.,"A Converting and End–Use Approach to Alkaline Fine Paper Size Development", Tappi Paper Makers Conf. Proceedings, (Apr. 1994).

Pamak® "Fatty Acids Distilled Tall Oils Light Ends Typical Properties and Uses" (Hercules) (1989) No Month Provided.

Pamolyn® Fatty Acids (Hercules) (1989) No Month Provided.

Product Handling Information, Bulletin PHI–2, Aquapel 364,380 and 421, Hercules Incorporated (Applicants stipulate that the document was published more than one (1) year before the filing date of the parent application) No Date Provided.

Technical Bulletin 145S, Specifications and Characteristics of Emery Oleochemicals (Henkel Corporation, Emery Group) (May 1993).

Brungardt et al, "Improving the Converting and End–Use Performance of Alkaline Fine Paper", 1994 Papermakers Confrence 155–163 (1994), No Month Provided.

Union Camp Oleochemicals® Product Data, Unidyme®18 Dimer Acids (Aug. 1995).

Union Camp Oleochemicals® Product Data, Unidyme®14 Distilled Dimer Acids (Aug. 1995).

W.O. Kincannon, Jr.et al, "D. Sizing With Alkylketene Dimers", Internal Sizing of Paper and Paperboard, pp. 157–170 (J.W. Swanson, Ed., TAPPI, 1971), No Month Provided.

Walkden,S.A., "Sizing With AKD—A Review of Trends, Theories adn Practical In–Mill Application and Troubleshooting", TAPPI Neutral/Alkaline Papermaking Short Course (Orlando, FL), pp. 67–70, (Oct. 16–18, 1990).

ALKALINE PAPER SURFACE SIZING AGENTS

CROSS-REFERENCE TO RELATED APPLICATION

This is a divisional of U.S. patent application Ser. No. 08/601,113, filed Feb. 16, 1996 now U.S. Pat. No. 5,846,663, which is a continuation-in-part of U.S. patent application Ser. No. 08/192,570, filed Feb. 7, 1994 now U.S. Pat. No. 5,685,815, issued Nov. 11, 1997.

FIELD OF THE INVENTION

This invention relates to paper sizing agents that have reactive functional groups that covalently bond to cellulose fiber and hydrophobic tails that are oriented away from the fiber, to paper surface sizing methods using such paper sizes and to surface sized paper.

BACKGROUND OF THE INVENTION

The amount of fine paper produced under alkaline conditions has been increasing rapidly, encouraged by cost savings, the ability to use precipitated calcium carbonate (PCC), an increased demand for improved paper permanence and brightness, and an increased tendency to close the wet-end of the paper machine.

Current applications for fine paper require particular attention to sizing before conversion or end-use, such as high-speed photocopies, envelopes, forms bond including computer printer paper, and adding machine paper. The most common sizing agents for fine paper made under alkaline conditions are alkenyl succinic anhydride (ASA) and alkyl ketene dimer (AKD). Both types of sizing agents have a reactive functional group that covalently bonds to cellulose fiber and hydrophobic tails that are oriented away from the fiber. The nature and orientation of these hydrophobic tails cause the fiber to repel water.

Commercial ASA-based sizing agents may be prepared by the reaction of maleic anhydride with an olefin ($C_{14}$–$C_{18}$).

Commercial AKD's, containing one β-lactone ring, are prepared by the dimerization of the alkyl ketenes made from two saturated, straight-chain fatty acid chlorides; the most widely used AKDs are prepared from palmitic and/or stearic acid. Other ketene dimers, such as the alkenyl based ketene dimer (Aquapel® 421 of Hercules Incorporated, Wilmington, Del., U.S.A.), have also been used commercially.

Ketene multimers, containing more than one β-lactone ring, have been disclosed as sizing agents for paper in Japanese Kokai 168991/89 and 168992/89, both of which are incorporated herein by reference. The ketene multimers are said to show improved sizing compared to the ketene dimers previously used, when applied as an internal size incorporated in the paper pulp slurry. The ketene multimers are prepared from a mixture of mono- and dicarboxylic acids.

Although ASA and AKD sizing agents are commercially successful, they have disadvantages. Both types of sizing agents, particularly the AKD type, have been associated with handling problems in the typical high-speed conversion operations required for the current uses of fine paper made under alkaline conditions (referred to as alkaline fine paper). The problems include reduced operating speed in forms presses and other converting machines, double feeds or jams in high-speed copiers, and paper-welding and registration errors on printing and envelope-folding equipment that operate at high speeds.

These problems are not normally associated with fine paper produced under acid conditions (acid fine paper). The types of filler and filler addition levels used to make alkaline fine paper differ significantly from those used to make acid fine paper, and these can cause differences in paper properties such as stiffness and coefficient of friction which affect paper handling. Alum addition levels in alkaline fine paper, which contribute to sheet conductivity and dissipation of static charge, also differ significantly from those used in acid fine paper. This is important because the electrical properties of paper affect its handling performance. Sodium chloride is often added to the surface of alkaline fine paper to improve its performance in end-use applications.

The typical problems encountered with the conversion and end-use handling of alkaline fine paper involve:

1. Paper properties related to composition of the papermaking furnish;
2. Paper properties developed during paper formation; and
3. Problems related to sizing.

The paper properties affected by paper making under alkaline conditions that can affect converting and end-use performance include:

Curl

Variation In Coefficient Of Friction

Moisture Content

Moisture Profile

Stiffness

Dimensional Stability

MD/CD Strength Ratios

One such problem has been identified and measured as described in "Improving The Performance Of Alkaline Fine Paper On The IBM 3800 Laser Printer," TAPPI Papermakers Conference Proceedings (1991), and in "Improving the Converting and End-Use Performance of Alkaline Fine Paper," TAPPI Papermakers Conference Proceedings (1994), pages 155–163, the disclosures of which are incorporated herein by reference. The problem occurs when using an IBM 3800 high speed continuous forms laser printer that does not have special modifications intended to facilitate handling of alkaline fine paper. That commercially-significant laser printer therefore can serve as an effective testing device for defining the convertibility of various types of sized paper on state-of-the-art converting equipment and its subsequent end-use performance. In particular, the s phenomenon of "billowing" gives a measurable indication of the extent of slippage on the IBM 3800 printer between the undriven roll beyond the fuser and the driven roll above the stacker.

Such billowing involves a divergence of the paper path from the straight line between the rolls, which is two inches (5 cm) above the base plate, causing registration errors and dropped folds in the stacker. The rate of billowing during steady-state running time is measured as the billowing height in inches above the straight paper path after 600 seconds of running time and multiplied by 10,000.

Typical alkaline AKD sized fine paper using a size furnish of 2.2 lbs. per ton (1.1 kilogram per metric tonne (kg/mtonne)) of paper shows an unacceptable rate of billowing, typically of the order of 20 to 80 inches of billowing per second×10,000 (51 to 203 cm/sec×10,000). Paper handling rates on other high-speed converting machinery, such as a Hamilton-Stevens continuous forms press or a Winkler & Dunnebier CH envelope folder, also provide numerical measures of convertibility.

There is a need for alkaline fine paper that provides improved handling performance in typical converting and reprographic operations. At the same time, the levels of sizing development need to be comparable to that obtained with the current furnish levels of AKD or ASA for alkaline fine paper.

SUMMARY OF THE INVENTION

One aspect of the invention is a surface sizing agent which is a 2-oxetanone ketene multimer that is not solid at a temperature of 35° C.

Another aspect of the invention is a method of sizing paper by surface sizing paper with these 2-oxetanone ketene multimer sizing agents.

Yet another aspect of the invention is paper surface sized with these 2-oxetanone ketene multimer sizing agents.

The method of this invention for making paper under alkaline conditions exhibits levels of sizing comparable to or better than those obtained with current AKD and ASA sizing technology, and gives improved handling performance in typical end-use and converting operations.

As used herein, "percent" or "%" means, with respect to components or ingredients of a compound, composition or mixture, the weight of the component or ingredient based on the weight of the compound, composition or mixture containing it, unless otherwise indicated.

DETAILED DESCRIPTION OF THE PREFERRED EMBODIMENTS

The present invention includes a sizing agent that is a 2-oxetanone-based multimer sizing agent (herein also referred to as 2-oxetanone multimer sizing agent or 2-oxetanone ketene multimer sizing agent), that at 35° C. is not a solid (not substantially crystalline, semi-crystalline, or waxy solid; i.e., it flows on heating without heat of fusion); paper made under alkaline conditions and treated with a surface sizing treatment comprising such sizing agent; and a method of making the sized paper using such sizing agent.

More preferably, the sizing agent according to the invention is a liquid at 25° C., or even at 20° C. (The references to "liquid" of course apply to the sizing agent per se and not to an emulsion or other combination.) The invention comprises a 2-oxetanone-based ketene multimer sizing agent having irregularities in the chemical structure of its pendant hydrophobic constituents; i.e., the chemical structure contains irregularities such as carbon-to-carbon double bonds or branching in one or more of the hydrocarbon chains. (Conventional alkyl ketene dimers are regular in that they have saturated straight-chain hydrocarbon chains).

The surface sizing agent of this invention is preferably a 2-oxetanone ketene multimer, or a mixture of such multimer compounds, having the formula (I)

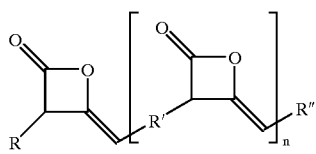

(I)

in which n is an integer of at least 1, preferably 1 to about 20 and more preferably about 1 to about 8. (In the formula (I), when n is 0, such compound is termed a 2-oxetanone ketene dimer.)

Mixtures of the 2-oxetanone ketene multimers preferably contain regio isomers of such multimer compounds and preferably contain an average n of from about 1 to about 8 and more preferably from about 2 to about 5. Such mixtures of 2-oxetanone ketene multimers may also contain some 2-oxetanone ketene dimer, i.e., n=0 in formula (I), as a consequence of the preparation method (described below) used to make the multimers.

R and R" are substantially hydrophobic in nature, are acyclic, are preferably hydrocarbons of at least about 4 carbon atoms in length and may be the same or different. R and R" are more preferably about $C_{10}-C_{20}$ and most preferably about $C_{14}-C_{16}$.

R and R", which may be the same or different, are preferably independently selected from the group of straight (linear) or branched alkyl or straight (linear) or branched alkenyl. R and R" are more preferably linear alkenyl. Preferably not all R and R" substituents are straight alkyl chains and preferably at least 25% by weight of the sizing agent comprises the 2-oxetanone structure in which at least one of R and R" is not straight chain (linear) alkyl. R and R" are ordinarily derived from a monocarboxylic acid reactant, e.g., fatty acid and preferably an unsaturated fatty acid, when the ketene multimer is prepared from reaction of a monoacid component with a diacid component, as described below.

R' may be a branched, straight chain, i.e., linear, or alicyclic, i.e., cyclic-containing, hydrocarbon and is preferably a hydrocarbon of from about 1 to about 40 carbon atoms. R' may more preferably be selected from about $C_2-C_{12}$ and most preferably from $C_4-C_8$; in such cases, R' is preferably a straight chain alkyl. Alternatively, R' may more preferably be selected from about $C_{20}-C_{40}$ and most preferably from about $C_{28}-C_{32}$; R' is preferably branched or alicyclic for the more preferred about $C_{20}-C_{40}$ and most preferred about $C_{28}-C_{32}$.

R' is ordinarily derived from a dicarboxylic acid reactant when the ketene multimer is prepared from reaction of a monoacid component with a diacid component, as described below.

The 2-oxetanone ketene multimer is preferably a mixture of 2-oxetanone ketene multimers, particularly a mixture of 2-oxetanone ketene multimers where at least 25 weight percent of the mixture is multimers containing hydrocarbon substituents with irregularities that may be branched alkyl, linear alkenyl and branched alkenyl.

Alkaline sizing agents of the present invention, that give levels of sizing comparable to those obtained with current AKD and ASA sizing technology and improved handling performance in typical end-use and converting operations, have a reactive 2-oxetanone group and pendant hydrophobic hydrocarbon tails. In that respect, they resemble traditional AKD-based sizing agents, but unlike the saturated straight chains in the fatty acids used to prepare conventional solid alkyl ketene dimer based sizing agents, the hydrocarbon chain in one or both of the fatty acid chlorides used to prepare this class of sizing agents contain irregularities in the chemical structure of the pendant hydrocarbon chains, such as carbon-to-carbon double bonds and chain branching. Due to the irregularities in the pendant hydrocarbon chains, these sizing agents are not solid, and preferably are liquid, at or near room temperature, i.e., about 25° C.

The 2-oxetanone multimer surface sizing agents of this invention may be formed from mixtures of a fatty acid and a dicarboxylic acid. Preferred fatty acids include oleic (octadecenoic), linoleic (octadecadienoic), palmitoleic (hexadecenoic), linolenic (octadecatrienoic), isostearic and mixtures of these and/or other fatty acids. Preferred commercially available fatty acids are Pamak®-1, Pamak®-131 or Pamolyn® 380 liquid fatty acids (fatty acid mixtures available from Hercules Incorporated, Wilmington, Del., U.S.A.) and comprising primarily oleic acid and linoleic acid. Other fatty acids that may be used are the following unsaturated fatty acids: dodecenoic, tetradecenoic (myristoleic), octadecadienoic (linolelaidic), eicosenoic (gadoleic), eicosatetraenoic (arachidonic), cis13-docosenoic (erucic), trans-13-docosenoic (brassidic), and docosapentaenoic (clupanodonic) acids and mixtures of such fatty acids.

More preferably, the 2-oxetanone ketene multimer sizing agent made from the foregoing types of fatty acids, i.e., containing irregularities such as unsaturation or branching, is at least 25% of the sizing agent, more preferably at least about 50% and most preferably at least about 70%.

Dicarboxylic acids that may be used to form the 2-oxetanone multimers of this invention include azelaic acid, sebacic acid and dodecanedioic acid, all of which are preferred. Dicarboxylic acids made by the dimerization of unsaturated (monocarboxylic) fatty acids may also be used where the resultant dicarboxylic acid is preferably a $C_{24}$–$C_{44}$ dicarboxylic acid, and more preferably a $C_{32}$–$C_{36}$ dicarboxylic acid. In situations where the dicarboxylic acid is a fatty acid dimer, the branching and/or, cyclic-structure of such fatty acid dimers should be understood to contribute to the irregularities present in the resultant 2-oxetanone ketene multimer sizing agent.

The ketene multimers of this invention may be defined by the ratio of fatty acid component to dicarboxylic acid component used to prepare the ketene multimers. The length of a ketene multimer oligomer, i.e., the value of n in the formula noted above, is a function of the molar ratio of fatty acid to dicarboxylic acid used to form the multimer.

Such ketene multimers are ordinarily a mixture of ketene multimers, with different chain lengths; some ketene dimer may also be present in the mixture, as mentioned previously, although such ketene dimer is unnecessary in the present invention. The 2-oxetanone ketene multimers of this invention are preferably mixtures containing n averaging from about 1 to about 8 and more preferably from about 2 to about 6, with an average n of about 2 to about 4 being the most presently preferred. The average value for n for a mixture of oxetanone ketene multimers may be calculated from molecular weights determined by size exclusion chromatography. Oxetanone ketene multimers having a specific n value, e.g., n=3, may be recovered or isolated from the ketene multimer mixtures by conventional separation techniques.

The mole ratio of the fatty acid component to the dicarboxylic acid component in the reaction mixture of such components used to form the multimers is preferably from about 4:1 to about 1:5, more preferably from about 2.5:1 to about 1:4 and most preferably from about 1:1 to about 1:3. Representative examples of such surface sizing agents include 2-oxetanone multimers formed from a mixture of oleic acid and sebacic acid at a mole ratio of about 2.5:1, and 2-oxetanone multimers prepared from a mixture of Pamak®-1 fatty acid and azelaic acid at a mole ratio of about 2.5:1. Preferred examples are 2-oxetanone multimers prepared from mixtures of Pamak®-131 and azelaic acid having mole ratios of from about 1:1 to about 1:4.

For use as surface sizing agents for the more preferred alkaline fine paper, the mole ratio of the fatty acid component to the dicarboxylic acid component is preferably about 1:1 to about 1:5, more preferably about 1:1.5 to about 1:4, and most preferably about 1:2.

These surface sizing agents may be prepared by known procedures; see, e.g., Japanese Kokai 168991/89 and Japanese Kokai 168992/89, the disclosures of which are incorporated herein by reference. In the first step, acid chlorides from a mixture of fatty acid and dicarboxylic acid are formed, using phosphorous trichloride or another conventional chlorination agent. In an alternative procedure, the acid chlorides may be prepared separately or sequentially from the fatty acid component and the dicarboxylic acid component. The acid chlorides in the reaction mixture are then dehydrochlorinated in the presence of triethylamine or another suitable base, to form the 2-oxetanone ketene multimer mixture. Stable emulsions of these surface sizing agents can be prepared in the same way as standard AKD emulsions.

The invention also comprises paper made under acid or alkaline papermaking conditions, preferably the latter, and surface sized with the 2-oxetanone-based ketene multimer sizing agent, that is, with a ketene multimer sizing agent containing the 2-oxetanone functionality.

The paper surface sized according to the invention does not encounter significant machine-feed problems on high speed converting machines or reprographic operations. Such problems are defined as significant in any specific conversion or reprographic application if they cause misfeeds, poor registration, or jams to a commercially unacceptable degree as will be discussed below, or cause machine speed to be reduced.

Preferably the invention further comprises alkaline paper that is surface treated with the 2-oxetanone based sizing agent according to the invention and contains a water soluble inorganic salt of an alkali metal, preferably NaCl, as well as alum and precipitated calcium carbonate (PCC). However, the paper of this invention will often be made without NaCl.

Preferably the surface sized paper according to the invention is capable of performing effectively in tests that measure its convertibility on state-of-the-art converting equipment and its performance on high speed end-use machinery. In particular, the paper according to the invention, that can be made into a roll of continuous forms bond paper having a basis weight of from about 15 to 26 lbs./1300 $ft^2$ (6.8 to 11.8 kg/121 $m^2$), more specifically about 17 to 22 lbs./1300 $ft^2$ (7.7 to 10 kg/121 $m^2$), and that is surface sized at an addition rate of at least about 0.05 pounds/ton (0.025 kg/mtonne), is capable of running on the IBM Model 3800 high speed, continuous-forms laser printer without causing a rate of billowing in inches of increase per second×10,000 greater than about 10 to 20.

Further, the preferred surface sized paper according to the invention, that can be made into sheets of 8 ½×11 inch (21.6 cm×27.9 cm) reprographic cut paper having a basis weight of about 15–26 lbs./1300 $ft^2$ (6.8–11.8 kg/121 $m^2$) and is surface sized at an addition rate of at least about 0.05 pounds/ton (0.025 kg/mtonne), is capable of running on a high speed laser printer or copier without causing misfeeds or jams at a rate of 5 or more in 10,000. The preferred paper according to the invention, having a basis weight of about 15–26 lbs./1300 $ft^2$ (6.8–11.8 kg/121 $m^2$), also can be converted to a standard perforated continuous form on a Hamilton-Stevens continuous form press at a press speed of at least about 1775 feet per minute (541 m/min).

The invention also comprises the process of converting the paper according to the invention to a standard perforated continuous form on a continuous forms press at a press speed of from about 1300 to 2000 feet per minute (396 to 610 m/min).

A further process according to the invention comprises running 8 ½×11 inch (21.6 cm×27.9 cm) reprographic cut paper, having a basis weight of about 15–26 lbs./1300 ft² (6.8–11.8 kg/121 m²), on a high speed, continuous laser printer or copier without causing misfeeds or jams at a rate of 5 or more in 10,000, preferably without causing misfeeds or jams at a rate of 1 or more in 10,000. By comparison, paper sized with standard AKD had a much higher rate of double feeds on an IBM 3825 high speed copier (14 double feeds in 14,250 sheets). In conventional copy-machine operation, 10 double feeds in 10,000 sheets is unacceptable. A machine manufacturer considers more than 1 double feed in 10,000 sheets to be unacceptable.

Another process according to the invention comprises converting the paper according to the invention into at least about 900 envelopes per minute, preferably at least about 1000 per minute.

The surface sized paper of this invention may be any fine paper grade that ordinarily requires sizing. Such paper includes continuous forms bond paper, envelope-making paper, offset printing paper, inkjet printing paper and adding machine paper, as well as converted products, such as copy paper and envelopes.

The surface sizing agent and method of this invention may also be employed with any other types of paper, including paper made under acid or alkaline papermaking conditions and including without limitation newsprint, paperboard such as liquid packaging paperboard, recycled liner paperboard, for example, and molded paper end-use applications that require sizing, and other paper products. Such applications include gluing with water-based adhesives, ink jet printing and offset printing.

The present invention also relates to a method of sizing paper by surface sizing paper with the 2-oxetanone ketene multimer sizing agents of the invention.

The surface sizing agents of this invention are applied via known surface sizing procedures, being applied externally to the preformed paper. Surface sizing ordinarily involves addition of the sizing agent at a size press on a paper machine, where the sizing agent is applied to or metered onto the surface of the paper. Alternatively, surface sizing may be carried out by addition of the sizing agent at the calender stack, or by spraying, or by other coating techniques. The surface sized paper is typically dried at elevated temperatures using known drying techniques.

The surface sizing agent of this invention is preferably applied to the surface of paper being surface sized in an amount of at least about 0.0025 wt %, based on the weight of the dry sized paper. Paper surface sized with the 2-oxetanone ketene multimer sizing agent of this invention preferably has from about 0.0025 wt % to about 0.5 wt %, more preferably, from about 0.005 wt % to about 0.2 wt % and most preferably, about 0.01 to about 0.1 wt % sizing agent present on the dry sized paper, based on the weight of the dry surface sized paper.

Water or any aqueous solution of size press additive may be used in combination with the sizing agent of this invention, when added at the size press. Addition levels of starch in the size press may range from 0 to about 100 kg/mtonne of dry sized paper. Size press starches suitable for use with the sizing agent of this invention include ethylated starch, oxidized starch, ammonium persulfate converted starch, enzyme converted starch, cationic starch and the like.

The addition of the 2-oxetanone ketene multimer sizing agent of this invention at the size press or via other means for surface sizing of paper provides satisfactory sizing performance without the need for an internal sizing agent. However, internal sizing agents may be used if desired. In the event that an internal sizing agent is employed, the internal size addition level for paper of this invention is preferably at least about 0.05 kg/mtonne (0.005 wt %), more preferably at least about 0.25 kg/mtonne (0.025 wt %) and most preferably at least about 0.5 kg/mtonne (0.05 wt %), all based on the weight of the dry sized paper. The internal sizing agent may be any conventional paper sizing agent and preferred internal sizing agents include alkyl ketene dimer, alkyl ketene multimer, alkenyl ketene dimer, alkenyl ketene multimer, alkyl succinic anhydride and alkenyl succinic anhydride.

The 2-oxetanone multimers of this invention are typically 2–10 times more efficient than commonly used surface paper sizing agents, e.g., high molecular weight styrene/maleic anhydride copolymers.

Another factor favoring use of the ketene multimer surface sizing agents of this invention is their high molecular weight. Lower molecular weight paper sizing agents such as alkenyl succinic anhydride and alkyl ketene dimer sizing agents, when added as surface sizing agents in the size press, can result in toner adhesion problems in copy paper and unsatisfactory paper handling performance. The ketene multimers of this invention also avoid the hydrolysis problems associated with use of ASA as a surface paper sizing agent; ASA when hydrolyzed may form deposits or precipitates that can result in surface defects on the sized paper or that can contaminate the paper machinery.

The invention will now be described with reference to the following specific, non-limiting examples.

Experimental Procedures I

Paper that was internally sized for evaluation on the IBM 3800 laser printer was prepared on a pilot paper machine at Western Michigan University.

To make a typical forms bond paper-making stock, the pulp furnish (three parts Southern hardwood kraft pulp and one part Southern softwood kraft pulp) was refined to 425 ml Canadian Standard Freeness (C.S.F.) using a double disk refiner. Prior to the addition of the filler to the pulp furnish (10% medium particle-size precipitated calcium carbonate), the pH (7.8–8.0), alkalinity (150–200 p.p.m.), and hardness (100 p.p.m.) of the paper making stock were adjusted using the appropriate amounts of $H_2SO_4$, $NaHCO_3$, $NaOH$, and $CaCl_2$.

The 2-oxetanone sizing agents, including the multimers, were prepared by methods used conventionally to prepare commercial alkyl ketene dimers (AKDs); i.e, acid chlorides from a mixture of fatty acid and dicarboxylic acid were formed, using a conventional chlorination agent, and the acid chlorides-were dehydrochlorinated in the presence of a suitable base.

A general procedure for preparation of a 2-oxetanone ketene product on a laboratory scale from a monocarboxylic fatty acid and a dicarboxylic acid, such as azelaic acid or a fatty acid dimer acid, is as follows. The mole ratio of monocarboxylic fatty acid component to dicarboxylic acid component is selected depending on whether a predominance of ketene dimer or a predominance of ketene multimer is desired. For ketene multimers with an average n of from about 1 to 6, a preferred mole ratio of monocarboxylic fatty acid to dicarboxylic acid is from about 1:1 to 1:4.

The fatty acid component is introduced to a stirred reactor, blanketed with nitrogen, and heated to about 70° C. The dicarboxylic acid component, if a liquid, is added directly to the reactor with the fatty acid, or, if a solid, is added gradually with stirring, to form a mixture of the two components. The two component mixture is then chlorinated at a temperature of about 65–70° C. with phosphorous trichloride, by gradual introduction of the $PCl_3$ chlorination agent over 15–30 minutes or more. After addition of the $PCl_3$, the chlorinated reaction product is stirred for an additional 15 minutes and then allowed to settle. Phosphorous acids that form as a byproduct of the chlorination reaction are drained from the bottom of the reactor and then excess $PCl_3$ reactant is removed from the reaction product by evaporation under vacuum.

Confirmation that acid chlorides are formed in the reaction product made by this procedure may be obtained by IR determination of the presence of a characteristic acid chloride absorbance at 1800 $cm^{-1}$.

Dehydrochlorination of the acid chlorides to form the desired 2-oxetanone ketene product is carried out in a reactor blanketed with nitrogen. About 1 part (by weight) triethylamine, base, typically representing a 5% molar excess of triethylamine, is added to about 2-7 parts (by weight) 1,2-dichloropropane solvent in the reactor with stirring, and both are heated to a temperature of about 30–40° C. About 1–3 parts of acid chloride reaction product in about one-half of that amount of 1,2-dichloropropane is added gradually to the reactor with stirring over about 40 minutes, while maintaining a temperature of about 40–45° C. Approximately two hours after the start of the addition of the acid chloride reaction product, completion of the dehydrochlorination reaction is confirmed with IR, and if the characteristic acid chloride absorbance is detected at 1800 $cm^{-1}$, additional triethylamine may be added as necessary to complete the dehydrochlorination reaction.

Upon completion of the dehydrochlorination reaction, the reaction mixture is filtered to remove byproduct triethylamine hydrochloride salts formed during the dehydrochlorination reaction. Subsequently, the 1,2-dichloropropane solvent is evaporated under vacuum, and additional triethylamine hydrochloride salts that precipitate are removed by filtration. The recovered product is a mixture which contains predominantly 2-oxetanone ketene multimer or dimer, depending on the specific molar ratios of fatty acid and dicarboxylic acid employed as the initial reactants. For use as a sizing agent, an emulsion of the 2-oxetanone ketene product is prepared.

The 2-oxetanone sizing agent emulsions, including the multimer emulsions, were prepared according to the disclosure of U.S. Pat. No. 4,317,756, which is incorporated herein by reference, with particular reference to Example 5 of the patent.

A sizing agent emulsion of a ketene multimer (or dimer) may be prepared by admixing 880 parts of water, 60 parts of cationic corn starch and 10 parts of sodium lignin sulfonate. The mixture is adjusted to pH of about 3.5 with sulfuric acid. The resulting mixture is heated at 90°–95° C. for about one hour. Water is then added to the mixture in an amount sufficient to provide a mixture of 1750 parts (total weight). About 240 parts of the ketene multimer (or dimer) is stirred into the mixture together with 2.4 parts of thiadiazine preservative. The resulting premix (at 65° C.) is homogenized in one pass through an homogenizer at 3000 p.s.i. The homogenized product is diluted with water to a ketene multimer (or dimer) solids content within the range of about 6% to about 30% to form a sizing agent emulsion; it should be understood that the precise solids content of the sizing agent emulsion is not critical.

Wet-end additions of sizing agent, quaternary-amine-substituted cationic starch (0.75%), alum (0.2%), and retention aid (0.025%) were made. Stock temperature at the headbox and white water tray was controlled at 110° F. (43° C.).

The wet presses were set at 40 p.s.i. gauge (207 cm Hg). A dryer profile that gave 1–2% moisture at the size press and 4–6% moisture at the reel was used (77 ft/min (23 m/min)). Before the size press, the sizing level was measured on a sample of paper torn from the edge of the sheet, using the Hercules Size Test (HST). The Hercules Size Test (HST) is a standard test in the industry for measuring the degree of sizing. This method employs an aqueous dye solution as the penetrant to permit optical detection of the liquid front as it moves through the sheet. The apparatus determines the time required for the reflectance of the sheet surface not in contact with the penetrant to drop to a predetermined percentage of its original reflectance. All HST testing data reported measure the seconds to 80% reflection with 1% formic acid ink mixed with naphthol green B dye (Hercules Test Ink #2) unless otherwise noted. The use of this formic acid ink is a more severe test than neutral ink and tends to give faster test times. High HST values are better than low values. The amount of sizing desired depends upon the kind of paper being made and the system used to make it. "Natural aged HST" values were obtained seven days after the paper was sized.

Approximately 35 lbs./ton (17.5 kg/mtonne) of an oxidized corn starch and 1 lb./ton (0.5 kg/mtonne) of NaCl were added at the size press (130° F. (54° C.), pH 8). Calender pressure and reel moisture were adjusted to obtain a Sheffield smoothness of 150 flow units at the reel (Column #2, felt side up).

A 35-minute roll of paper from each paper making condition was collected and converted on a commercial forms press to two boxes of standard 8 ½"×11" (21.6 cm×27.9 cm) forms. Samples were also collected before and after each 35 minute roll for natural aged size testing, basis weight (20 lbs./1300 $ft^2$ (9.1 kg/121 $m^2$)), and smoothness testing.

The converted paper was allowed to equilibrate in the printer room for at least one day prior to evaluation. Each box of paper allowed a 10–14 minute (220 ft/min (67 m/min)) evaluation on the IBM 3800 laser printer. All samples were tested in duplicate. A standard acid fine paper was run for at least two minutes between each evaluation to reestablish initial machine conditions.

The height of billowing in inches at the end of the run, and the rate at which billowing occurred ((inches of increase in billowing per second)×10,000), were used to measure the effectiveness of each approach.

EXAMPLE 1

A number of sizing agents were tested as internal sizes for their effects on the IBM 3800 laser printer runnability of a difficult-to-convert grade of alkaline fine paper. The above Experimental Procedures I were followed.

The rate of paper billowing on an IBM 3800 high speed printer was used to evaluate the converting performance of each sample of paper, as described above under Experimental Procedures I. A summary of the results of this testing is given in Table 1.

Several 2-oxetanone based alkaline sizing agents are shown that give a better balance of sizing and runnability on the IBM 3800 laser printer (for instance, less billowing at similar levels of sizing) than a standard alkyl ketene dimer (AKD) sizing agent used as a control for comparative purposes. The standard AKD sizing agent was made from a mixture of stearic and palmitic acids, by conventional methods. This is a conventional, standard sizing agent of the type that lacks any irregularities, such as double bonds or branching, in its pendant hydrocarbon chains. The best balance of sizing and handling performance was obtained with one of the following agents: a 2-oxetanone based dimer sizing material made from a mixture of about 73% oleic acid, about 8% linoleic acid, and about 7% palmitoleic acid, the remainder being a mixture of saturated and unsaturated fatty acids, available from Henkel Corporation's Emery Group (Gulph Mills, Pa., U.S.A.) under the name Emersol™ NF (referred to herein for convenience along with similar sizes based on oleic acid as an oleic acid size).

Another 2-oxetanone dimer sizing agent was prepared from Pamolyn® 380 fatty acid, consisting primarily of oleic and linoleic acid and available from Hercules Incorporated, Wilmington, Del., U.S.A., and a 2-oxetanone dimer sizing agent made from isostearic acid. All these sizing agents were liquids at 25° C., and in particular, at equal sizing levels, gave better converting performance on the IBM 3800 laser printer than the control, a standard AKD sizing agent made from a mixture of stearic and palmitic acids.

TABLE 1

| Composition of Size | Addition Level (lbs./ton (kg/mtonne)) | Natural Aged HST (sec.) | Rate of Billowing* |
|---|---|---|---|
| Oleic Acid | 1.5 (0.75) | 122 | 1.6 |
| " | 2.2 (1.1) | 212 | 15.1 |
| " | 3.0 (1.5) | 265 | 29.4 |
| " | 4.0 (2.0) | 331 | 55.5 |
| Oleic Acid (Pamolyn ® 380) | 2.2 (1.1) | 62 | 1.6 |
| Isostearic | 2.2 (1.1) | 176 | 1.5 |
| Control (AKD) | 1.5 (0.75) | 162 | 23.8 |
| " | 2.2 (1.1) | 320 | 55.0 |

*Inches of billowing/sec. × 10,000.

EXAMPLE 2

Additional sizing agents were tested as internal sizes for their effects on IBM 3800 laser printer paper runnability in a second set of experiments, in which the Experimental Procedures I described above were followed.

A conventional AKD emulsion and an ASA emulsion were evaluated as controls. The AKD sizing agent was a standard AKD as described in Example 1, with the emulsion being prepared generally as described above under Experimental Procedures I. The ASA emulsion was prepared as described by Farley and Wasser in "The Sizing of Paper (Second Edition)," "Sizing with Alkenyl Succinic Anhydride" page 51, (1989), the disclosure of which is hereby incorporated by reference. The performance parameters measured in these studies were natural aged sizing and runnability on the IBM 3800 laser printer. A summary of the results of these evaluations is given in Table 2.

The materials tested gave a better balance of sizing and converting performance (less billowing at the same level of sizing) than either of the commercial ASA or AKD sizing agents used as controls. The best balance of sizing and handling performance was obtained with a 2-oxetanone dimer size prepared from Pamak®-1 fatty acid (a mixture comprised primarily of oleic and linoleic acid) and a 2-oxetanone multimer prepared from a 2.5:1 mixture of oleic acid and sebacic acid, both prepared generally as described above under Experimental Procedures I. Both sizing agents gave levels of sizing comparable to that obtained with the ASA and AKD controls. Both sizing agents gave paper with better runnability on the IBM 3800 laser printer than the paper sized with either the ASA or AKD standards.

TABLE 2

| Composition of Size | Addition Level (lbs./ton (kg/mtonne)) | Natural Aged HST (sec.) | Rate of Billowing |
|---|---|---|---|
| Oleic/Linoleic | 1.5 (0.75) | 34 | <1.7 |
| Oleic/Linoleic | 2.2 (1.1) | 203 | <1.7 |
| Oleic Linoleic | 3.0 (1.5) | 193 | <4.6 |
| Oleic Linoleic | 4.0 (2.0) | 250 | 17.5 |
| Oleic/Sebacic | 1.5 (0.75) | 53 | <10.4 |
| Oleic Sebacic | 2.2 (1.1) | 178 | <1.7 |
| Oleic Sebacic | 3.0 (1.5) | 270 | <3.4 |
| Oleic Sebacic | 4.0 (2.0) | 315 | 16.6 |
| Control (AKD) | 1.5 (0.75) | 162 | 166 |
| Control (AKD) | 2.2 (1.1) | 320 | 48 |
| Control (ASA) | 1.5 (0.75) | 127 | 52 |
| Control (ASA) | 2.2 (1.1) | 236 | 83 |
| Control (ASA) | 3.0 (1.5) | 286 | 166 |

EXAMPLE 3

Two 2-oxetanone multimers prepared from mixtures of azelaic acid and oleic acid generally as described under Experimental Procedures I and with mole ratios as shown in Table 3 and from mixtures of azelaic acid and oleic/linoleic fatty acid, were tested as internal sizes. Paper for testing was prepared on the pilot paper machine using the conditions described in the Experimental Procedures I. A standard paper internally sized with a commercial AKD size dispersion, such as described in Example 1, was evaluated as a control. A summary of the results of these internal size evaluations is given in Table 3.

Both types of 2-oxetanone multimer gave levels of HST sizing similar to those obtained with the standard AKD control. Both multimer sizes gave lower levels of billowing on the IBM 3800 laser printer than the control.

TABLE 3

| Composition of Size | Addition Level (lbs./tan (kg/mtonne)) | Natural Aged HST (sec.) | Rate of Billowing |
|---|---|---|---|
| Oleic/Azelaic 2.5:1 | 2.2 (1.1) | 186 | <1.2 |
| Oleic Azelaic 2.5:1 | 3 (1.5) | 301 | <2.2 |
| Oleic Azelaic 2.5:1 | 4 (2) | 347 | <2.3 |
| Oleic/ | 2.2 | 160 | <2.4 |

TABLE 3-continued

| Composition of Size | Addition Level (lbs./tan (kg/mtonne)) | Natural Aged HST (sec.) | Rate of Billowing |
|---|---|---|---|
| Linoleic: Azelaic 2.5:1 | (1.1) | | |
| Oleic Linoleic: Azelaic 2.5:1 | 3 (1.5) | 254 | <2.4 |
| Oleic Linoleic: Azelaic 2.5:1 | 4 (2) | 287 | <2.4 |
| Control | 2.2 (1.1) | 267 | 10 |
| Control | 3 (1.5) | 359 | 23 |

EXAMPLE 4

A series of Pamak®-1 fatty acid: azelaic acid 2-oxetanone multimers with fatty acid to dicarboxylic acid ratios ranging from 1.5:1 to 3.5:1 were evaluated as internal sizes in a fourth set of experiments. These 2-oxetanone ketene multimers were prepared generally as described above in Experimental Procedures I. Paper for testing was again prepared on the pilot paper machine at Western Michigan University using the conditions described in the Experimental Procedures I. The performance parameters measured in these studies were: natural aged sizing efficiency and runnability on the IBM 3800 laser printer. Standard AKD and ASA sized paper were evaluated as controls. A summary of the results of these evaluations is given in Table 4.

All of the Pamak®-1: azelaic acid 2-oxetanone multimers gave a better balance of sizing and IBM 3800 laser printer runnability than either of the commercial controls.

TABLE 4

| Composition of Size | Addition Level (lbs./ton (kg/mtonne)) | Natural Aged HST (sec.) | Rate of Billowing |
|---|---|---|---|
| 1.5:1 | 2.5 (1.2) | 209 | <5 |
| " | 4.5 (2.2) | 339 | <5 |
| 2.5:1 | 2.0 (1.0) | 214 | <5 |
| " | 3.5 (1.8) | 312 | <5 |
| " | 4.0 (2.0) | 303 | <5 |
| 3.5:1 | 2.5 (1.2) | 312 | <5 |
| " | 4.0 (2.0) | 303 | <5 |
| Control (AKD) | 1.5 (0.75) | 255 | <5 |
| Control (AKD) | 3.0 (1.5) | 359 | 15 |
| Control (ASA) | 3.0 (1.5) | 253 | 23 |

An evaluation as internal sizing agents of a 2-oxetanone ketene dimer size made from oleic acid (generally as described above under Experimental Procedures I), with a comparison to an AKD commercial size made from a mixture of palmitic and stearic acids (generally as described in Example 1), was carried out on a high speed commercial fine paper machine (3000 ft/min (914 m/min), 20 tons (18.2 mtonnes) of paper produced per hour, 15 lbs./1300 ft$^2$ (6.8 kg/121 m$^2$)). A typical forms bond paper making stock similar to that used in the Experimental Procedures I was used. Addition levels of the two internal sizing agents were adjusted to give comparable levels of HST sizing (20–30 seconds, 85% reflectance, Hercules Test Ink #2). No deposits were observed on the paper machine.

The paper produced under these conditions was then evaluated on a high speed Hamilton continuous forms press. The Hamilton press converts paper to a standard perforated continuous form. Press speed was used as a measure of performance. Two samples of the AKD control were tested before and after the evaluation of the paper sized with the oleic acid based size. The results are shown in Table 5. The paper sized with the oleic acid size clearly converted at a significantly higher press speed than the paper sized with the AKD control.

TABLE 5

| Run # | Sizing Agent | Hamilton Press speed |
|---|---|---|
| 1 | AKD CONTROL | 1740 f.p.m. (530 m/min) |
| 2 | AKD CONTROL | 1740 f.p.m. (530 m/min) |
| 3 | OLEIC ACID 2-OXETANONE | 1800 f.p.m. (549 m/min) |
| 4 | OLEIC ACID 2-OXETANONE | 1775 f.p.m. (541 m/min) |
| 5 | AKD CONTROL | 1730 f.p.m. (527 m/min) |
| 6 | AKD CONTROL | 1725 f.p.m. (526 m/min) |

EXAMPLE 6

An evaluation as internal sizing agents of oleic acid 2-oxetanone ketene dimer size (prepared generally as described above under Experimental Procedures I), with a comparison with an AKD commercial standard size prepared from a mixture of palmitic and stearic acid (generally as described in Example 1) was carried out on a commercial paper machine producing a xerographic grade of paper (3100 ft/min (945 m/min), 18 lbs./1300 ft$^2$ (8.2 kg/921 m$^2$)). As in Example 5, addition levels of each sizing agent were adjusted to give comparable levels of HST sizing after natural aging (100–200 seconds of HST sizing, 80% reflectance, Hercules Test Ink #2). No deposits were observed on the paper machine. The paper produced with oleic acid 2-oxetanone size ran without any jams or double feeds on a high speed IBM 3825 sheet fed copier (no double feeds in 14,250 sheets). Paper prepared with the AKD controls had a much higher rate of double feeds on the IBM 3825 (14 double feeds in 14,250 sheets).

EXAMPLE 7

A 2-oxetanone dimer sizing agent was prepared for evaluation as an internal size from oleic acid by known methods, generally as described above under Experimental Procedures I. A sizing emulsion was then prepared from the oleic acid-based size by known methods, generally as described above under Experimental Procedures I. Copy paper internally sized with the oleic acid-based 2-oxetanone sizing emulsion was made on a commercial fine paper machine (3100 ft/min (945 m/min), 40 tons (36.4 mtonnes) of paper produced per hour, 20 lbs./1300 ft$^2$ (9.1 kg/121 m$^2$), 10% precipitated calcium carbonate, 1 lb. of sodium chloride/ton of paper (0.5 kg/mtonne) added at the size press). Copy paper sized with a standard AKD (prepared from a mixture of palmitic acid and stearic acid generally as described in Example 1) sizing emulsion was also made as a control. The addition level of each sizing agent was adjusted to give 50–100 seconds of HST sizing (1.4 lbs. (0.7 kg/mtonne) of standard commercial AKD, 1.9–2.1 lbs. (0.95–1.05 kg/mtonne) of oleic acid size per ton of paper, 80% reflectance, Hercules Test Ink #2).

The copy paper internally sized with oleic acid-based 2-oxetanone sizing agent ran without any jams or double feeds on a high speed IBM 3825 sheet fed copier (no double feeds in 99,000 sheets). The paper sized with the AKD control had a much higher rate of double feeds on the IBM 3825 (14 double feeds in 27,000 sheets).

EXAMPLE 8

Two samples of 2-oxetanone-based dimer sizing agents were prepared for evaluation as internal sizing agents respectively from oleic acid and Pamak®-1 fatty acid by known methods, generally as described above under Experimental Procedures I. Sizing emulsions were prepared from both sizes. Forms bond paper samples internally sized respectively with the Pamak®-1 fatty acid-based dimer size and the oleic acid-based 2-oxetanone dimer sizing agent were made on a commercial fine paper machine (approximately 3000 ft/min (914 m/min), 16 lbs./1300 ft$^2$ (7.3 kg/121 m$^2$), 5 lbs./ton (2.5 kg/mtonne) alum, 10 lbs./ton (5 kg/mtonne) quaternary amine substituted starch). Forms bond paper sized with a commercial AKD (prepared from a mixture of palmitic acid and stearic acid) sizing emulsion was also made as a control. The addition level of each sizing agent (See Table 6) was adjusted to give comparable levels of HST sizing at the reel (70% reflectance, Hercules Test Ink #2).

The paper produced under these conditions was converted on a high speed Hamilton continuous forms press. The Hamilton press converts paper to a standard perforated continuous form. Press speed was used as a measure of paper performance. The results are listed in the following Table 6. Each press speed is an average of measurements made on six different rolls of paper. The paper sized with the oleic acid-based 2-oxetanone size and the paper sized with the Pamak®-1 fatty acid-based 2-oxetanone size converted at a significantly higher press speed than the paper sized with the AKD control.

TABLE 6

| Run # | Sizing Agent | Add'n Level | HST Sizing (seconds) | Hamilton Press Speed |
| --- | --- | --- | --- | --- |
| 1 | AKD Control | 2.0 lbs./Ton (1 kg/mtonne) | 208 | 1857 ft/min (566 m/min) |
| 2 | Oleic Acid-based Size | 2.5 lbs./Ton (1.25 kg/mtonne) | 183 | 1957 ft/min (596 m/min) |
| 3 | PAMAK®-1 Fatty Acid-based Size | 2.5 lbs./Ton (1.25 kg/mtonne) | 185 | 1985 ft/min (605 m/min) |

EXAMPLE 9

A 2-oxetanone-based dimer sizing agent was prepared from oleic acid by known methods, generally as described above under Experimental Procedures I. A sizing emulsion was then prepared for evaluation as an internal sizing agent from the oleic acid-based 2-oxetanone dimer sizing agent by known methods, generally as described above under Experimental Procedures I. Envelope paper internally sized with the oleic acid-based sizing emulsion and containing 16% precipitated calcium carbonate was made on a commercial fine paper machine in two basis weights, 20 lbs. per 1300 ft$^2$ (9.1 kg/121 m$^2$) and 24 lbs. per 1300 ft$^2$ (10.9 kg/121 m$^2$). Envelope paper internally sized with a standard commercial AKD (prepared from a mixture of palmitic acid and stearic acid) and a commercial surface sizing agent (0.5 lb./ton (0.25 kg/mtonne) Graphsize A) sizing emulsion was also made as a control. The addition level of each internal sizing agent was adjusted to give comparable levels of HST sizing at the reel (100–200 seconds, 80% reflectance, Hercules Test Ink #2).

The paper internally sized with each of the two sizing agents was converted to envelopes on a Winkler & Dunnebier CH envelope folder. The 20-lb. (9.1 kg) paper was converted to "Church" envelopes. The 24-lb. (10.9 kg) paper was converted to standard #10 envelopes. Envelope production rate (envelopes per minute) was used as a measure of paper converting performance. The results are listed in the following Table 7. The paper sized with the oleic acid-based 2-oxetanone size converted at a significantly higher speed than the paper sized with the AKD control.

TABLE 7

| Sizing Agent | Size Add'n Level | HST (sec.) | Basis weight | Product | Envelopes per Minute |
| --- | --- | --- | --- | --- | --- |
| AKD Control | 2.0 lbs./Ton (1 kg/mtonne) | 100–150 | 20 lbs. (9.1 kg) | Church Envelope | 850 |
| Oleic Acid-based Size | 2.9 lbs./Ton (1.45 kg/mtonne) | 100–150 | 20 lbs. (9.1 kg) | Church Envelope | 900–950 |
| AKD Control | 1.5 lbs./Ton (0.75 kg/mtonne | 100–150 | 24 lbs. (10.9 kg) | #10 Envelope | 965 |
| Oleic Acid-based Size | 2.5 lbs./Ton (1.25 kg/mtonne) | 100–150 | 24 lbs. (10.9 kg) | #10 Envelope | 1000–1015 |

Experimental Procedures II

The papermaking procedures used to make paper for evaluation of surface sizing, toner adhesion and inkjet quality were generally similar to those described under Experimental Procedures I noted earlier. Paper was again prepared on the pilot paper machine at Western Michigan University. The paper had a basis weight of 20 lbs./1300 ft$^2$ (9.1 kg/121 m$^2$).

To make a typical forms bond paper-making stock, the pulp furnish (three parts hardwood kraft pulp and one part softwood kraft pulp) was refined to 425 ml Canadian Standard Freeness (C.S.F.) using a double disk refiner. Prior to the addition of the filler to the pulp furnish (12% medium particle-size precipitated calcium carbonate), the pH (7.8–8.0), alkalinity (150–200 p.p.m.), and hardness (100 p.p.m.) of the paper making stock were adjusted using the appropriate amounts of $H_2SO_4$, $NaHCO_3$, $NaOH$, and $CaCl_2$.

Wet-end conditions were as follows: tray pH 7.6–8.0; temperature 49° C.; and 180 ppm total alkalinity.

Wet-end additions were made as follows: precipitated calcium carbonate filler (12%) at the first mixing box, quaternary-amine-substituted cationic starch (0.50%) at the first mixing box outlet, alum (0.25%) at the second mixing box outlet valve, and an internal sizing agent at the second mixing box valve.

The internal sizing agent added at the wet-end was a commercially-available alkenyl ketene dimer paper sizing agent, made from a fatty acid feedstock consisting primarily of oleic and linoleic acids, and this was utilized at three different usage levels, 0.1%, 0.125%; and 0.15%, all percentages being by weight based on the dry weight of the paper furnish. Stock temperature at the white water tray and head box was controlled at 49° C. (120° F.).

The wet presses were set at 40 p.s.i. gauge (207 cm Hg). A dryer profile that gave 1–2% moisture at the size press and 4–6% moisture at the reel was used (77 ft/min (23 m/min) paper machine speed). Before the size press, the sizing level was measured on a sample of paper torn from the 20 edge of the sheet, using the Hercules Size Test (HST). With Hercules Test Ink #2, the reflectance was 80%.

Approximately 50 kg/metric tonne of an oxidized corn starch and 2.5 kg/metric tonne of NaCl were added at the size press (66° C./150° F., pH 8). The surface sizing agent 25 was also added at the size press, in amounts as indicated in the Examples which follow. Calender pressure and reel moisture were adjusted to obtain a Sheffield smoothness of 150 flow units at the reel (Column #2, felt side up).

EXAMPLE 10

This Example describes the preparation of a mixture of 2-oxetanone multimer compounds from a mixture of fatty acids and a dicarboxylic acid at a mole ratio of 1:2 fatty acid to dicarboxylic acid. In Example 10A, the dicarboxylic acid was a $C_{36}$ dicarboxylic acid, and in Example 10B, the dicarboxylic acid was azelaic acid.

The chlorination of the fatty acid and dicarboxylic acid mixture was carried out in a 500 mL glass-jacketed reactor fitted with a condenser, an addition funnel, and nitrogen adapters, which was sparged with nitrogen gas (each piece of glassware having been oven dried at 105° C. prior to assembly). The nitrogen gas flow was vented through a NaOH scrubber. The reactor was initially heated to 105° C. with a heat gun and cooled under a steady stream of nitrogen.

The dehydrochlorination of the acid chloride reaction product was carried out in a 1 L glass-jacketed reactor fitted with a condenser, an addition funnel, and nitrogen adapters, where was sparged with nitrogen gas (each piece of glassware having been oven dried at 105° C. prior to assembly). The reactor was initially heated to 105° C. with a heat gun and cooled under a steady stream of nitrogen.

Example 10A: The chlorination of the fatty acid and $C_{36}$ dicarboxylic acid was carried out as follows. After the 500 mL reactor was cooled to room temperature, 87.8 g (0.31 mole) Pamak®-131 fatty acid mixture (Hercules Incorporated, Wilmington, Del., U.S.A.) and 353.1 g (0.62 mole) Unidyme®-14 $C_{36}$ dicarboxylic acid (Union Camp Corp., Wayne, N.J., U.S.A.) were added to the reactor. At this point, the reactor was placed under a static nitrogen blanket instead of a nitrogen gas sweep, i.e., the nitrogen gas flow was stopped. The reactor containing the two liquid components was then heated using a recirculating mineral oil bath set at 70° C. After the temperature of the reactants had reached 65° C., 67.8 mL $PCl_3$ (1.574 g/mL, B.P. 76° C., Aldrich Chemical Co., Inc., Milwaukee, Wis., U.S.A.) was loaded into the addition funnel and added to the mixture over a period of 30 minutes. vigorous evolution of HCl was noted, particularly at the beginning of the $PCl_3$ addition, but little or no exotherm was measured. Fifteen minutes after the addition of $PCl_3$ was complete, the stirrer was stopped. After ten minutes of settling, 29.9 g of phosphorous acids, a byproduct of the chorination reaction, were drained from the bottom of the reactor. Small amounts of phosphorous acids were removed each hour over the next four hours, with a total of 35.4 g phosphorous acids being removed. Finally, excess unreacted $PCl_3$ was removed on a rotary evaporator (vacuum pump pressure, 60° C.) over a 2-hour period. 453.7 g of acid chloride reaction product were isolated, a yield of 97.9%. An I.R. spectrum for the isolated reaction product showed a characteristic acid chloride absorbance at 1800 $cm^{-1}$.

The dehydrochlorination reaction was carried out as follows. After the 1 L reactor was cooled to room temperature, 440 mL 1,2-dichloropropane solvent (1.156 g/mL, B.P. 95–96° C., Fluka Chemical Corp., Ronkonkoma, N.Y., U.S.A.) and 115.2 mL (0.83 mole) triethylamine (0.726 g/mL, B.P. 88.8° C., Aldrich Chemical Co., Inc., Milwaukee, Wis., U.S.A.) were added to the reactor, the stirrer was started (150 r.p.m.) and the reactor contents were heated to 30° C. using a recirculating water bath. At this point, the nitrogen gas flow in the reactor was switched to a nitrogen blanket. A 235.4 g aliquot of acid chloride reaction product was then added to the addition funnel along with 110 mL 1,2-dichloropropane. The contents of the addition funnel were gradually added to the reactor over a period of 40 minutes. Stirrer speed, the temperature of the recirculating water bath, and the addition rate of the acid chloride reaction product were adjusted to control the exotherm and maintain the temperature of the reaction mixture between 40°–45° C. The stirrer speed was gradually increased from 150 r.p.m. to 400 r.p.m. over the course of the addition. Two hours after the start of the addition, the reaction was checked for acid chloride by I.R. Completion of the dehydrochlorination reaction is indicated when no acid chloride absorbance at 1800 $cm^{-1}$ is observed. Additional triethylamine may be added to complete the reaction, as necessary.

Once the dehydrochlorination reaction was complete, the reaction mixture was cooled to room temperature (about 25° C.) and filtered using a Buchner funnel to remove byproduct triethylamine hydrochloride salts formed by the reaction. Approximately half of the 1,2-dichloropropane solvent in the filtrate was then removed using a rotary evaporator (vacuum pump, 60° C.). The reaction product was filtered a second time to remove additional triethylamine hydrochloride salts that had precipitated during evaporation of the 1,2-dichloropropane. The remainder of the 1,2-dichloropropane was then removed on the rotary evaporator (vacuum pump, 60° C., three hours). The reaction product was then filtered a third time to remove any remaining triethylamine hydrochloride salts. Total product yield was 137 g 2-oxetanone ketene multimer product, a yield of 65%. The product was a liquid at 25° C., and analysis by size exclusion chromatography indicated that the mixture of ketene multimers had an average n of about 4.

Example 10B: The chlorination of the fatty acid and azelaic dicarboxylic acid was carried out as follows. After the 500 mL reactor was cooled to room temperature, 140.0 g (0.50 mole) Pamak®-131 fatty acid mixture (Hercules Incorporated, Wilmington, Del., U.S.A.) was added to the reactor and heated to a temperature of 70° C. At this point, the nitrogen gas flow in the reactor was switched to a nitrogen blanket. Next, 181 g (1.0 mole) 85% azelaic acid mixture, containing 15% other dicarboxylic acids of different chain lengths (E-1110 from Henkel Corporation's Emery Group, Gulph Mills, Pa., U.S.A.), were gradually introduced into the reactor with vigorous stirring (250 r.p.m.) over a three minute period. The solid dicarboxylic acid component formed a coarse dispersion with the liquid fatty acid component in the reactor, and the temperature dropped about 10° C. during the addition. After the temperature of the reactants reached 70° C., 108 mL $PCl_3$ (1.574 g/mL, B.P. 76° C., Aldrich Chemical Co., Inc., Milwaukee, Wis., U.S.A.) was loaded into the addition funnel and added to the mixture over a period of 30 minutes. Vigorous evolution of HCl was noted, particularly at the beginning of the $PCl_3$ addition, but little or no exotherm was measured. The dispersed dicarboxylic acid component dissolved during addition of the $PCl_3$. Fifteen minutes after the addition of $PCl_3$ was complete, the stirrer was stopped. After ten minutes of settling, 70.8 g phosphorous acids, a byproduct of the chorination reaction, were drained from the bottom of the reactor. Small amounts of phosphorous acids were removed each hour over the next three hours, with a total of 71.9 g phosphorous acids (104% of theoretical) being removed. Finally, excess unreacted $PCl_3$ was removed on a rotary evaporator (vacuum pump pressure, 60° C.) over a 2-hour period. 349.6 g of acid chloride reaction product was isolated, a yield of 93%. An I.R. spectrum for the isolated reaction product showed a characteristic acid chloride absorbance at 1800 $cm^{-1}$, with a small side band being observed at 1710 $cm^{-1}$.

The dehydrochlorination reaction was carried out as follows. After the 1 L reactor was cooled to room temperature, 500 mL 1,2-dichloropropane solvent (1.156 g/mL, B.P. 95–96° C., Fluka Chemical Corp., Ronkonkoma, N.Y., U.S.A.) and 286 mL (2.05 mole) triethylamine (0.726 g/mL, B.P. 88.8° C., Aldrich Chemical Co., Inc., Milwaukee, Wis., U.S.A.) were added to the reactor, the stirrer was started (150 r.p.m.) and the reactor contents were heated to 40° C. using a recirculating water bath. At this point, the nitrogen gas flow was switched to a nitrogen blanket. A 280.8 g aliquot of acid chloride reaction product was then added to the addition funnel along with 133 mL 1,2-dichloropropane. The contents of the addition funnel were gradually added to the reactor over a period of 40 minutes. Stirrer speed, the temperature of the recirculating water bath, and the addition rate of the acid chloride reaction product were adjusted to control the exotherm and maintain the temperature of the reaction mixture between 40°–45° C. The stirrer speed was gradually increased from 150 r.p.m. to 400 r.p.m. over the course of the addition. Two hours after the start of the addition, the reaction was checked for acid chloride by I.R. Completion of the dehydrochlorination reaction is indicated when no acid chloride absorbance at 1800 $cm^{-1}$ is observed, although acid anhydride absorbance at 1815 $cm^{-1}$ can complicate this measurement. Additional triethylamine may be added to complete the reaction, as necessary.

Once the dehydrochlorination reaction was complete, the reaction mixture was cooled to room temperature (about 25° C.) and filtered using a Buchner funnel to remove byproduct triethylamine hydrochloride salts formed by the reaction. The separated triethylamine salts were reslurried in 150 mL 1,2-dichloropropane at about 25° C. to extract any dehydrochlorinated reaction product trapped in the salts and filtered a second time. The filtrates were combined, and approximately half of the 1,2-dichloropropane solvent in the filtrate was then removed using a rotary evaporator (vacuum pump, 60° C.). The reaction product was filtered again to remove additional triethylamine hydrochloride salts that had precipitated during evaporation of the 1,2-dichloropropane. The remainder of the 1,2-dichloropropane was then removed on the rotary evaporator (vacuum pump, 60° C., three hours). The total reaction product yield was 175 g 2-oxetanone ketene multimer product, a yield of 82%. The product was a liquid at 25° C., and analysis by size exclusion chromatography indicated that the mixture of ketene multimers had an average n of about 4.

EXAMPLE 11

This Example describes the use of four ketene multimers of this invention as surface sizing agents.

The four ketene multimers were prepared from Pamak®-131 fatty acid and azelaic acid mixtures having the following molar ratios of fatty acid component to dicarboxylic acid component: 2.5:1, 1:1, 1:2 and 1:4. The procedure used to make the ketene multimer mixtures was similar to that described in Example 10.

For comparison, two surface sizing agents were included as controls, at three usage levels, as shown in Table 8 below: alkenyl ketene dimer, made from a linoleic and oleic acid mixture (generally as described above under Experimental Procedures I), and styrene-maleic anhydride copolymer.

The addition levels of the four ketene multimers in the size press were 0.005, 0.015 and 0.025 wt %, based on the weight of the dry sized paper.

In addition to the surface sizing agents utilized in the size press, an internal sizing agent was also used: alkenyl ketene dimer (as described above) was added at the wet end of the papermaking machine, at usage levels of 0.1–0.15 wt %, based on the weight of dry sized paper.

The results of these surface sizing evaluations are summarized in Table 8. Sizing efficiencies for the treated paper that are shown in the Table are measured as Hercules Sizing Test results, taken at three points: prior to the size press, at the reel after the size press and after natural aging for about seven days.

All four of the ketene multimers tested gave large increases in sizing at the reel, after the size press surface sizing treatment, over all usage levels evaluated.

Three of the ketene multimers (2.5:1, 1:1, 1:2 fatty acid: diacid ratios) provided sizing differences, at a 0.005 wt % addition level, that were comparable to the alkenyl ketene dimer surface sizing agent control (at 0.005 wt %) and the styrene/maleic anhydride copolymer surface sizing agent control (at 0.05 wt %). The same three ketene multimers, at a 0.025 wt % usage level, provided sizing efficiencies that were comparable to the alkenyl ketene dimer sizing agent control (at 0.025 wt %) and styrene/maleic anhydride copolymer sizing agent (at 0.15 wt %). The ketene multimer with the 1:4 fatty acid to diacid ratio provided smaller, but still significant, increases in sizing efficiency at the reel.

The results for the first three ketene multimers (2.5:1, 1:1, 1:2 fatty acid (FA) to diacid (DA) ratios) indicated that at a given usage level, these ketene multimer surface sizing agents are 6–10 times more effective than a conventional surface sizing agent, the styrene/maleic anhydride copolymer, used as a control.

TABLE 8

| Size Press Sizing Agent and Addition Level (wt%) | AKD Internal Size Addition Level (wt%) | HST: before size press (sec) | HST: at reel (sec) | HST: after aging 7 days (sec) | Black Ink Line Growth | Black Ink Front Optical Density | TONER Toner Adhesion |
|---|---|---|---|---|---|---|---|
| none | 0.1 | 22 | 3 | 2 | 9 | 1.09 | 0.40 |
| styrene/maleic anhydride copolymer 0.05 | 0.1 | 19 | 15 | 10 | 9 | 1.13 | 0.32 |
| alkenyl ketene dimer 0.005 | 0.1 | — | 23 | 19 | 8 | 1.11 | 0.41 |
| alkenyl ketene multimer 2.5:1 FA:DA 0.005 | 0.1 | — | 16 | 14 | 8 | 1.11 | — |
| alkenyl ketene multimer 1:1 FA:DA 0.005 | 0.1 | — | 22 | 19 | 2 | 1.11 | — |
| alkenyl ketene multimer 1:2 FA:DA 0.005 | 0.1 | 13 | 18 | 17 | 8 | 1.12 | 0.42 |
| alkenyl ketene multimer 1:4 FA:DA 0.005 | 0.1 | — | 10 | 8 | 8 | 1.10 | — |
| styrene/maleic anhydride copolymer 0.15 | 0.1 | — | 66 | 59 | 8 | 1.13 | 0.35 |
| alkenyl ketene dimer 0.025 | 0.1 | — | 54 | 39 | 7 | 1.15 | 0.48 |
| alkenyl ketene multimer 2.5:1 FA:DA 0.025 | 0.1 | 29 | 64 | 39 | 4 | 1.13 | — |
| alkenyl ketene multimer 1:1 FA:DA 0.025 | 0.1 | — | 68 | 39 | 7 | 1.14 | — |
| alkenyl ketene multimer 1:2 PA:DA 0.025 | 0.1 | 14 | 58 | 40 | 7 | 1.13 | 0.41 |
| alkenyl ketene multimer 1:4 FA:DA 0.025 | 0.1 | — | 40 | 20 | 6 | 1.10 | — |
| none | 0.1 | 20 | 7 | 4 | 8 | 1.10 | 0.43 |
| none | 0.15 | 131 | 59 | 56 | 6 | 1.23 | 0.48 |
| styrene/maleic anhydride copolymer 0.05 | 0.15 | — | 82 | 90 | 5 | 1.25 | 0.44 |
| alkenyl ketene dimer 0.005 | 0.15 | — | 92 | 91 | 6 | 1.27 | 0.42 |
| alkenyl ketene multimer 2.5:1 FA:DA 0.005 | 0.15 | 104 | 85 | 81 | 5 | 1.23 | — |
| alkenyl ketene multimer 1:1 FA:DA 0.005 | 0.15 | — | 94 | 71 | 7 | 1.23 | — |
| alkenyl ketene multimer 1:2 FA:DA 0.005 | 0.15 | 110 | 92 | 64 | 7 | 1.21 | 0.41 |
| alkenyl ketene multimer | 0.15 | — | 66 | 70 | 5 | 1.20 | — |

TABLE 8-continued

| SIZING AGENTS | | SIZING PROPERTY | | | INKJET QUALITY | | |
|---|---|---|---|---|---|---|---|
| Size Press Sizing Agent and Addition Level (wt%) | AKD Internal Size Addition Level (wt%) | HST: before size press (sec) | HST: at reel (sec) | HST after aging 7 days (sec) | Black Ink Line Growth | Black Ink Front Optical Density | TONER Toner Adhesion |
| 1:4 FA:DA 0.005 | | | | | | | |
| none | 0.15 | 151 | 88 | 84 | 8 | 1.28 | 0.45 |
| styrene/maleic anhydride copolymer 0.15 | 0.15 | 147 | 145 | 135 | 2 | 1.28 | 0.41 |
| alkenyl ketene dimer 0.025 | 0.15 | 133 | 141 | 133 | 5 | 1.32 | 0.42 |
| alkenyl ketene multimer 2.5:1 FA:DA 0.025 | 0.15 | — | 153 | 132 | 5 | 1.30 | — |
| alkenyl ketene multimer 1:1 FA:DA 0.025 | 0.15 | 123 | 172 | 140 | 5 | 1.31 | — |
| alkenyl ketene multimer 1:2 FA:DA 0.025 | 0.15 | — | 133 | 101 | 5 | 1.26 | 0.45 |
| alkenyl ketene multimer 1:4 FA:DA 0.025 | 0.15 | 132 | 111 | 99 | 6 | 1.25 | — |
| none | 0.15 | 120 | 43 | 55 | 5 | 1.20 | 0.44 |
| none | 0.125 | 103 | 31 | 15 | 8 | 1.15 | — |
| styrene/maleic anhydride copolymer 0.1 | 0.125 | — | 77 | 75 | 4 | 1 16 | — |
| alkenyl ketene dimer 0.015 | 0.125 | — | 72 | 63 | 7 | 1.17 | — |
| alkenyl ketene multimer 2.5:1 FA:DA 0.015 | 0.125 | 51 | 83 | 58 | 7 | 1.16 | — |
| alkenyl ketene multimer 1:1 FA:DA 0.015 | 0.125 | — | 83 | 73 | 8 | 1.21 | — |
| alkenyl ketene multimer 1:2 FA:DA 0.015 | 0.125 | 102 | 84 | 65 | 6 | 1.17 | — |
| alkenyl ketene multimer 1:4 FA:DA 0.015 | 0.125 | — | 58 | 56 | 6 | 1.16 | — |
| none | 0.125 | 87 | 14 | 16 | 7 | 1.13 | — |

EXAMPLE 12

The surface sized paper produced with the four ketene multimers in Example 11 was evaluated for inkjet printing quality in this Example, using a Hewlett Packard Model 560C Deskjet® inkjet printer. Two inkjet print quality characteristics were measured: black ink line growth and optical density of the printed black ink. Results are summarized in Table 8 in the two columns under "INKJET QUALITY".

Black ink line growth was measured by visual evaluation of line growth by feathering or wicking, i.e., spreading of ink beyond the printed line borders. Print samples were compared to ten samples, ranked as 1–10 with 1 being the best and 10 being the worst quality. Results are summarized in Table 8 above, under the column heading "Black Ink Line Growth".

At the lowest usage level of ketene multimer surface size, all four ketene multimers provided black ink line growth that was at least comparable to a paper with a conventional surface-sizing surface sized at a substantially higher usage level with a styrene/maleic anhydride copolymer surface sizing agent.

At the highest usage level, the ketene multimer surface size provided approximateley equivalent black ink line growth as compared to the conventional surface size, but the latter was used at a significantly higher usage level than the ketene multimer size.

Black ink front optical density values were obtained by optical density measurements of black ink printed onto the sized paper, such measurements being made on the front, i.e., printed side of the paper. High optical density values are desirable since they indicate good quality, dense black ink printing. The results, shown in the penultimate column of Table 8, show that the ketene multimer surface sizes generally provide satisfactory black ink optical density values comparable to the styrene/maleic anhydride copolymer surface sizing agent used at significantly higher usage levels, particularly at the higher internal size levels used concurrently with the ketene multimer surface size.

The results shown in Table 8 indicate that the four ketene multimer surface sizing agents evaluated are cost effective replacements for a conventional polymeric surface sizing agent like styrene/maleic anhydride copolymer, for paper grades requiring good inkjet printing quality.

EXAMPLE 13

This Example evaluated photocopier toner adhesion on copy paper surface sized with a ketene multimer sizing agent, added at the sizing press.

The ketene multimer was prepared from a reaction mixture containing Pamak®-131 fatty acids and azelaic acid in a 1:2 mole ratio. The procedure used to prepare the ketene multimer was similar to that described in Example 10.

For comparison, two conventional surface sizes were also included in the evaluation. The first was paper sized with a styrene/maleic anhydride copolymer sizing agent, added at the size press at two usage levels, 0.05 and 0.15 wt %, based on the weight of the dry sized paper. Such conventional polymeric sizing agents provide good toner adhesion and were included in this Example as a performance benchmark.

The second surface size included for comparative purposes was paper surface sized with an alkenyl ketene dimer sizing agent, made from a mixture of linoleic and oleic acids, the sizing agent being added at the size press at two usage levels, 0.005 wt % and 0.025 wt %, based on the weight of the dry sized paper. Paper containing no surface size was also included in the evaluation.

An internal size, the alkenyl ketene dimer used as a surface size, was also included as a wet end additive in the papermaking process, at two usage levels, 0.1 wt % and 0.15 wt %, based on the weight of the dry sized paper.

Toner adhesion on the sized paper was evaluated using an optical density method that measured the difference in optical density between black toner photocopied onto the front of the (uncreased) paper and the same black photocopied toner with a crack formed by creasing the paper (by folding and unfolding). Poor toner adhesion typically results in formation of a larger width crack at the crease; the difference in the two optical density measurements is therefore large. Low values for the optical density difference indicate good toner adhesion.

Results are summarized in Table 8 above, where photocopier toner adhesion values are reported in the last column.

As expected, the polymeric (styrene/maleic acid copolymer) surface-sized paper provided good toner adhesion and the alkenyl ketene dimer surface-sized paper exhibited poorer toner adhesion. Increasing the level of internal size used in combination with the surface size tended to result in reduced toner adhesion.

Use of the ketene multimer as a surface sizing agent resulted in mixed but generally satisfactory toner adhesion, with very little difference in toner adhesion from that obtained with the untreated control.

Based on these results, ketene multimers are expected to be more efficient sizing agents than traditional polymeric surface sizing agents, without the toner adhesion problems associated with traditional ketene dimer sizing agents.

It is not intended that the Examples given here should be construed to limit the invention, but rather they are submitted to illustrate some of the specific embodiments of the invention. Various modifications and variations of the present invention can be made without departing from the scope of the appended claims.

What is claimed is:

1. A sizing agent which comprises a 2-oxetanone ketene multimer that is not solid at a temperature of 35° C.

2. The sizing agent of claim 1 which is a liquid at 35° C.

3. The sizing agent of claim 1 where the sizing agent comprises a mixture of 2-oxetanone ketene multimers that is not solid at a temperature of 35° C.

4. The sizing agent of claim 3 wherein at least 25 weight percent of the mixture comprises multimers containing hydrocarbon substituents with irregularities, the hydrocarbon substituents with irregularities being selected from the group consisting of branched alkyl, linear alkenyl and branched alkenyl groups.

5. The sizing agent of claim 1 wherein the 2-oxetanone ketene multimer has the formula (I)

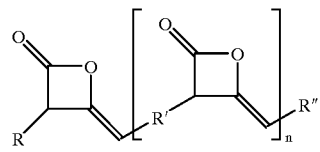

in which n is an integer of at least 1;

R and R" are independently acyclic hydrocarbons of at least about 4 carbon atoms; and R' is a branched, linear or alicyclic hydrocarbon of about 1 to about 40 carbon atoms.

6. The sizing agent of claim 5 wherein, in the formula (I), n is an integer of from 1 to about 20.

7. The sizing agent of claim 6 wherein, in the formula (I), n is an integer of 1 to about 8.

8. The sizing agent of claim 5 wherein the sizing agent comprises a mixture of 2-oxetanone ketene multimers having the formula (I).

9. The sizing agent of claim 8 wherein, in the mixture of 2-oxetanone ketene multimers, the average n, in the formula (I), for the mixture of multimers is about 1 to about 8.

10. The sizing agent of claim 8 wherein the sizing agent mixture contains about at least 25 weight percent of 2-oxetanone ketene multimers in which irregularities are present in R or R" or both, where the irregularities are selected from the group consisting of branched alkyl, linear alkenyl and branched alkenyl groups.

11. The sizing agent of claim 8 which further comprises preparing the mixture of 2-oxetanone ketene multimers from a mixture of fatty acid and dicarboxylic acid in a mole ratio of from about 4:1 to about 1:5 fatty acid to dicarboxylic acid.

12. The sizing agent of claim 8 which further comprises preparing the mixture of 2-oxetanone ketene multimers from a mixture of fatty acid and dicarboxylic acid in a mole ratio of from about 2.5:1 to about 1:4 fatty acid to dicarboxylic acid.

13. The sizing agent of claim 8, wherein the mixture of 2-oxetanone ketene multimers is prepared from a mixture of an unsaturated fatty acid mixture and a dicarboxylic acid.

14. The sizing agent of claim 13 wherein the fatty acid is selected from the group consisting of oleic, linoleic, linolenic, palmitoleic, and mixtures thereof.

15. The sizing agent of claim 13 wherein the dicarboxylic acid is selected from the group consisting of azelaic acid, sebacic acid, dodecanedioic acid and a fatty acid dimer acid.

16. The sizing agent of claim 4 wherein, in the formula (I), R and R" are independently branched alkyl or linear alkyl or branched alkenyl or linear alkenyl.

17. The sizing agent of claim 16 wherein, in the formula (I), R and R" have about 10 to about 20 carbon atoms.

18. The sizing agent of claim 5 wherein, in the formula (I), R' is selected from the group consisting of $C_2$–$C_{12}$ hydrocarbon and $C_{20}$–$C_{40}$ hydrocarbon.

19. The sizing agent of claim 18 wherein, in the formula (I), R' is a branched or alicyclic hydrocarbon having about 28 to about 32 carbon atoms.

20. The sizing agent of claim 18 wherein, in the formula (I), R' is a linear alkyl having about 4 to about 8 carbon atoms.

21. The sizing agent of claim 1 wherein the 2-oxetanone ketene multimer is a surface size.

* * * * *